Figure 1:
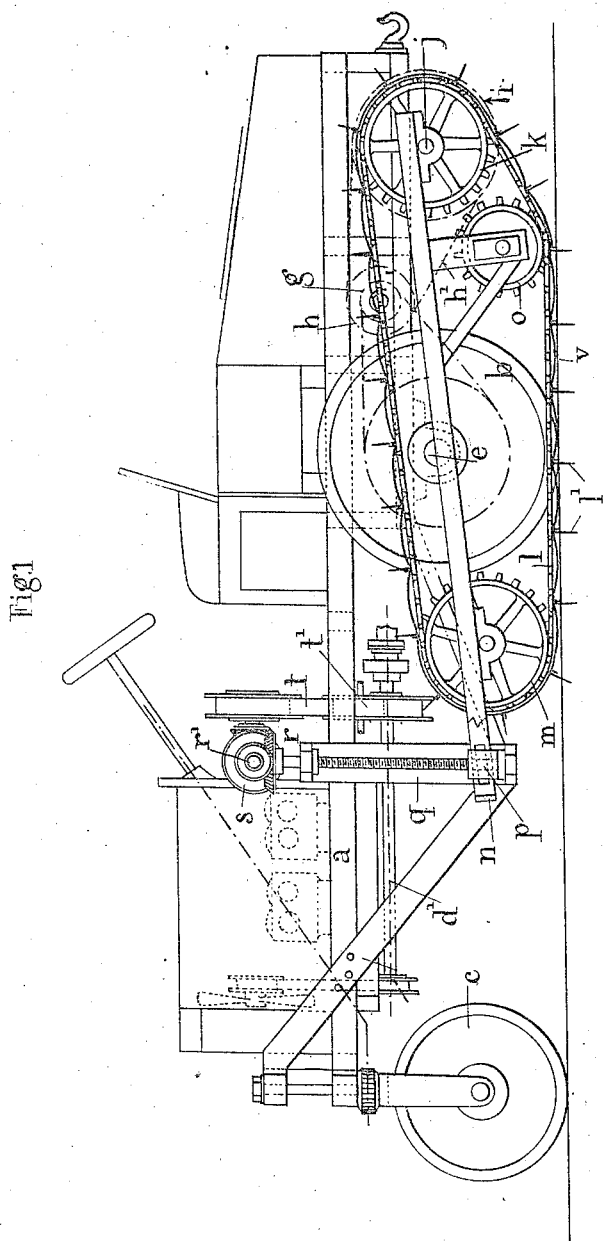

F. E. E. LEFEBVRE.
AUTOMOBILE TRACTOR.
APPLICATION FILED MAY 16, 1911.

1,054,649.

Patented Feb. 25, 1913.
3 SHEETS—SHEET 1.

WITNESSES
L. H. Grote
M. E. Keis

INVENTOR
FRÉDÉRIC EDOUARD EDMOND LEFEBVRE
BY Howson and Howson
his Attorneys

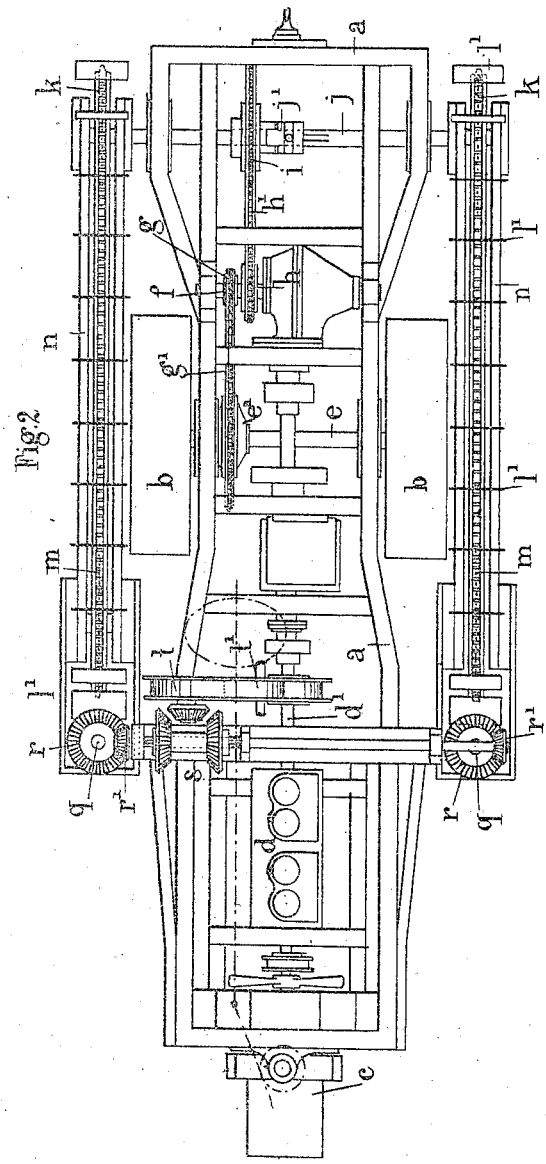

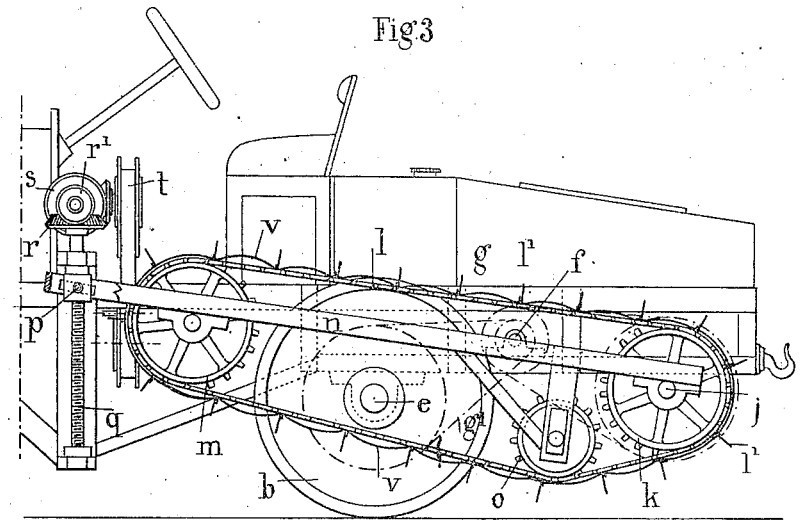
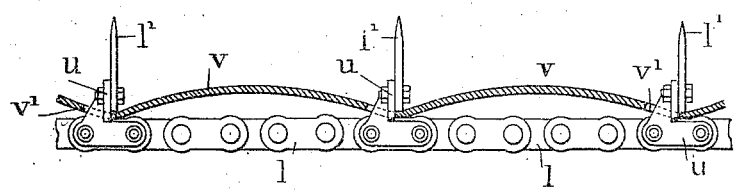
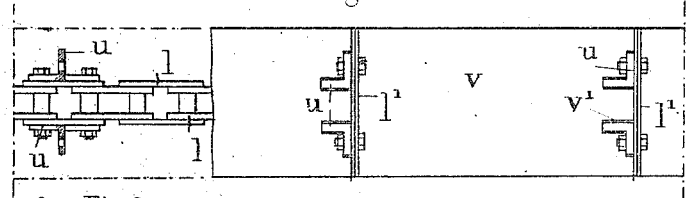
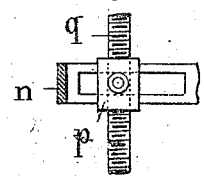
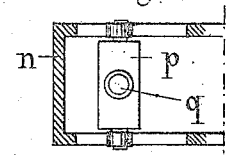

UNITED STATES PATENT OFFICE.

FRÉDÉRIC EDOUARD EDMOND LEFEBVRE, OF ROUEN, FRANCE.

AUTOMOBILE-TRACTOR.

1,054,649.

Specification of Letters Patent.   Patented Feb. 25, 1913.

Application filed May 16, 1911. Serial No. 627,537.

*To all whom it may concern:*

Be it known that I, FRÉDÉRIC EDOUARD EDMOND LEFEBVRE, a citizen of the Republic of France, and a resident of 1 Rue du Champ des Oiseaux, Rouen, Seine-Inférieure, France, have invented certain new and useful Improvements in Automobile-Tractors, of which the following is a specification.

This invention relates to an automobile tractor adapted for agricultural operations and provided with driving means presenting great adherence which enable it to travel in the fields.

This automobile tractor is represented by way of example in the accompanying drawing, in which:

Figure 1 is a side elevation showing the driving or propelling means operative. Fig. 2 is a plan view. Fig. 3 is a side elevation showing the propelling means raised. Figs. 4 to 7 are detail views to a larger scale.

The apparatus consists of a frame $a$ mounted upon three wheels, two driving wheels $b$ behind and a steering wheel $c$ in front controlled by a pinion and tangential screw. In front a motor $d$ of any suitable type is mounted; through clutches and transmission gear of the known kind this motor drives the axle $e$ which carries the driving wheels $b$. The axle $e$ which is mounted on a differential $e'$ constitutes a live axle in two parts which permits of the smallest possible turns because the steering wheel $c$ is able to rotate completely around its axis under the influence of the hand steering wheel.

The shaft $f$ of the gearing-down pinions carries two sprockets $g$ and $h$ one of which drives the axle $e$ through the chain $g'$ and the other a toothed wheel $i$ through the chain $h'$, the shaft $j$ of which carries at each end a toothed crown $k$ driving a chain $l$ which rolls on a toothed crown $m$ mounted in a rocking frame $n$, the point of articulation of which is constituted by the shaft $j$. Each of the chains $l$ termed "adherence chains" carries at equal intervals special links furnished with pallets $l'$ of sheet steel (Figs. 4 and 5) hereinafter referred to; a toothed pinion $o$ rigid with the movable frame $n$ serves to regulate the tension of the chain and also serves to withdraw the pallets at a given angle, thereby facilitating their disengagement and preventing any earth from being projected.

In the operative position each of the chains $l$, the lower length of which should be taut and parallel with the ground, is brought into the proper position by the following means: Each of the frames $n$ is connected in proximity to its extremity with a part $p$ (Figs. 5 and 6) forming a nut through which passes a vertical screw $q$ arranged in supports appropriately secured to the frame $a$. At their upper parts the screws $q$ carry a bevel pinion $r$ meshing with another pinion $r'$ the shaft of which carries reversing gear comprising bevel pinions $s$ and driven by the intermediary of a belt $t$ connected with the driving shaft $d'$. A jockey or tensioning roller $t'$, the operating means for which is located within reach of the driver, serves as an engaging device and operation of the reversing gear (the control for which is also arranged within reach of the driver's hand) enables him, without leaving his seat, to raise or lower the arms $n$ and consequently the chains $l$, the pallets of which enter the ground or are withdrawn therefrom entirely according to the position of the frames. The shaft $j$ is also provided with a claw clutch $j'$ which enables the chains to be thrown out of gear when they are raised.

The pallets $l'$ are fixed to the chain by the intermediary of a small angle iron $u$ bolted to the links of the chain, this arrangement enabling the pallets to be readily and rapidly replaced. Furthermore, in order to protect the joints of the links completely from dust and projected earth the exterior of the chains is covered with a band of flexible leather or other suitable material $v$ comprising suitable openings $v'$ for the passage of the angle irons $u$. It will of course be understood that the pallets $l'$ are not fixed until the flexible band is arranged in place whereby this band is held by the foot of the said pallets.

When the chains $l$ produce their adherence their lower length is brought into position parallel with the ground in such a manner that the pallets $l'$ located along this lower length enter the ground vertically one by one as they present themselves in front of the pinion $m$ thus constituting a continuous anchorage which presents a considerable bearing for the propulsion of the tractor. The latter advances in hauling itself as upon a rack upon the length of chain thus fixed to the ground by the pallets, the speed with which the apparatus advances being exactly equal to the velocity of the chain. This velocity is calculated so that it is equal to the peripheral velocity of the driving wheel in such a manner that the two systems (driving wheels and adherence chains) coöperate in the propulsion of the tractor. As the adherence is not here directly proportionate to the weight of the apparatus the latter can be made light and powerful at the same time, which is a very advantageous condition for traveling in the fields.

I claim—

1. An automobile tractor, comprising a light automobile, and supporting wheels therefor and a motor, a differential, and a driving connection with said wheels from the motor through said differential, in combination with auxiliary traction means comprising a pair of endless driving chains arranged one on each side of the vehicle, soil entering and engaging pallets carried thereby, means to raise and lower said chain to bring only said pallets into substantial engagement with the soil, and a driving connection from the motor through the differential to said chains whereby only a tractive effort is exercised by said chains, substantially as described.

2. An automobile tractor comprising a light automobile supported upon traction wheels, a motor, a differential and an operative connection through the latter for driving the traction wheels, a supplemental shaft, a driving connection through the differential therefor, a pair of chain wheels on the shaft, a pair of frames pivoted on the shaft, chain wheels carried thereby and pallet-carrying endless chains mounted on said chain wheels, together with means for lifting and lowering said frames to bring only the pallets into substantial engagement with the soil so that only a tractive effort will be exerted through the auxiliary chains, substantially as described.

3. An automobile tractor comprising a light automobile supported upon wheels, a motor and driving gear for said wheels, in combination with auxiliary traction means driven by the motor and comprising a relatively light endless chain, soil entering and engaging pallets carried thereby and means for raising and lowering said chain to bring only said pallets into substantial engagement with the soil, whereby tractive effort alone is exerted by said chain, together with a band of flexible leather interposed between the pallets and chain links to protect the latter from dirt and grit.

4. An automobile tractor comprising a light automobile supported upon wheels, a motor and driving gear for said wheels, in combination with auxiliary traction means driven by the motor and comprising a relatively light endless chain, soil entering and engaging pallets carried thereby and means for raising and lowering said chain to bring only said pallets into substantial engagement with the soil, whereby tractive effort alone is exerted by said chain, together with a chain supporting frame pivoted on the tractor, and triangularly arranged chain wheels in said frame so placed as to effect the entrance of the pallets into the soil substantially at the perpendicular and their emergence from the soil at an angle only slightly from the perpendicular whereby not only is the greatest tractive force secured, but the least soil lifted by the emerging pallets, substantially as described.

5. An automobile tractor comprising an automobile supported upon traction wheels, a motor and an operative connection between the same, in combination with auxiliary tractive means alone comprising endless chains with soil entering and engaging pallets and means for raising and lowering said pallet chains to bring the pallets into operative position when desired, substantially as described.

In testimony whereof I have signed my name to this specification, in the presence of two subscribing witnesses.

FRÉDÉRIC EDOUARD EDMOND LEFEBVRE.

Witnesses:
LOUIS JOSEPH MAXIME DESCHAMPS,
ERNEST HORTHENE DUBOIS.